US009304606B2

(12) United States Patent
Endo et al.

(10) Patent No.: US 9,304,606 B2
(45) Date of Patent: Apr. 5, 2016

(54) IMAGE DISPLAY SYSTEM

(71) Applicant: SEIKO EPSON CORPORATION, Tokyo (JP)

(72) Inventors: Koji Endo, Sapporo-Shi (JP); Kotaro Kato, Sapporo-Shi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 74 days.

(21) Appl. No.: 13/888,628

(22) Filed: May 7, 2013

(65) Prior Publication Data

US 2013/0300658 A1 Nov. 14, 2013

(30) Foreign Application Priority Data

May 9, 2012 (JP) ................................. 2012-107362

(51) Int. Cl.
*G06F 3/033* (2013.01)
*G06F 3/042* (2006.01)
*G06F 3/0488* (2013.01)
*G06F 3/0354* (2013.01)

(52) U.S. Cl.
CPC ............ *G06F 3/033* (2013.01); *G06F 3/03545* (2013.01); *G06F 3/0425* (2013.01); *G06F 3/04883* (2013.01)

(58) Field of Classification Search
CPC ... G06F 3/048; G06F 3/0338; G06F 3/03543; G06F 1/169; G06F 3/0362; G06F 3/03545

USPC .................................................. 345/157, 156
See application file for complete search history.

(56) References Cited

U.S. PATENT DOCUMENTS

| 5,548,705 | A | * | 8/1996 | Moran et al. | .................. 715/863 |
| 6,249,276 | B1 | * | 6/2001 | Ohno | .................. G06F 3/03545 |
| | | | | | 345/173 |
| 2005/0060658 | A1 | * | 3/2005 | Tsukiori | ........................ 715/765 |
| 2009/0096994 | A1 | * | 4/2009 | Smits | .............................. 353/30 |
| 2010/0199191 | A1 | | 8/2010 | Takahashi | |
| 2010/0253621 | A1 | * | 10/2010 | Suzuki et al. | ................. 345/157 |
| 2011/0279248 | A1 | * | 11/2011 | Ogawa | ........................ 340/13.25 |
| 2012/0263381 | A1 | * | 10/2012 | Yoshida | .............. G06F 3/03545 |
| | | | | | 382/189 |

FOREIGN PATENT DOCUMENTS

| JP | A-2010-181978 | 8/2010 |
| JP | A-2011-28629 | 2/2011 |

* cited by examiner

*Primary Examiner* — Kevin M Nguyen
(74) *Attorney, Agent, or Firm* — Oliff PLC

(57) ABSTRACT

An image display system includes: an image display unit that displays an image indicated by image data on a display surface; a trajectory data generation unit that specifies a position on the display surface indicated by a pointer and generates trajectory data indicating a trajectory of the pointer; and a trajectory data processing unit that performs processing in a mode corresponding to the pointer for the trajectory data generated by the trajectory data generation unit, wherein the image display unit displays an image of a trajectory, which is indicated by the trajectory data generated by the trajectory data generation unit, on the display surface.

18 Claims, 8 Drawing Sheets

| DEVICE ID | WAVELENGTH | SAVE | PRINT | DELETE | ENCRYPTION |
|---|---|---|---|---|---|
| ... | ... | ... | ... | ... | ... |
| ... | ... | ... | ... | ... | ... |
| ... | ... | ... | ... | ... | ... |

| IMAGE ID | TYPE | PRINT | DELETE | ENCRYPTION |
|---|---|---|---|---|
| ... | BACKGROUND | — | — | — |
| ... | TRAJECTORY | ... | ... | ... |
| ... | TRAJECTORY | ... | ... | ... |

| DEVICE ID | : ... |
| SAVE | : POSSIBLE |
| PRINT | : IMPOSSIBLE |
| DELETE | : POSSIBLE |
| ENCRYPTION | : NO |

FIG. 10

IMAGE DISPLAY SYSTEM

The entire disclosure of Japanese Patent Application No. 2012-107362, filed May 9, 2012 is expressly incorporated by reference herein.

BACKGROUND

1. Technical Field

The present invention relates to a technique for managing the data indicating an image that is written by a user on an image displayed by a display apparatus, such as a projector.

2. Related Art

There is a product called an interactive white board (hereinafter, referred to as an "IWB"). The IWB enables a user to perform pseudo-writing on an image, which is displayed on the display surface by a display apparatus such as a projector, using a pen type device or the like.

That is, the display apparatus displays an image showing the trajectory of the writing operation, which is performed on the display surface by the user, so as to be superimposed on an image already displayed on the display surface. As a result, pseudo-handwriting of figures or characters on the displayed image is possible.

Examples of the document that discloses the technique regarding the IWB include JP-A-2011-028629. According to the system disclosed in JP-A-2011-028629, an image showing the trajectory of infrared light, which is emitted to a screen from a pointer used at the time of presentation, is superimposed on an image projected from the projector to the screen. As a result, the user can write figures or characters on the image, which is being displayed on the screen, in a pseudo manner using a pointer.

In a meeting and the like using the IWB, there is a case where it is necessary to share some of the information written in the presentation materials or the like only between the attendees of the meeting. In such a case, an operation to select an image showing the information, which should not be known to people who are not the attendees of the meeting, of the written information and delete or encrypt it has been required in the related art.

SUMMARY

An advantage of some aspects of the invention is to provide unit for managing the information written by the user on the IWB more intuitively than in the related art.

An aspect of the invention is directed to an image display system including: an image display unit that displays an image indicated by image data on a display surface; a trajectory data generation unit that specifies a position on the display surface indicated by a pointer and generates trajectory data indicating a trajectory of the pointer; and a trajectory data processing unit that performs processing in a mode corresponding to the pointer for the trajectory data generated by the trajectory data generation unit. The image display unit displays an image of a trajectory, which is indicated by the trajectory data generated by the trajectory data generation unit, on the display surface.

According to this image display system, the user can intuitively designate a mode of the process of the trajectory data by selecting a pointer according to the purpose from a plurality of pointers having different authorities, for example, and using the selected pointer for writing.

The image display system according to the aspect of the invention may be configured such that the trajectory data processing unit performs at least one of display of an image indicated by the trajectory data, saving of the trajectory data, printing of an image indicated by the trajectory data, deletion of the trajectory data, encryption of the trajectory data, and changes of attributes of the trajectory data.

According to the image display system of this configuration, the user can designate whether to display trajectory data generated by writing, whether to save the trajectory data, whether to print the trajectory data, whether to delete the trajectory data, whether to encrypt the trajectory data, whether to change the attributes of the trajectory data, and the like by selecting a pointer used for writing, for example.

The image display system according to the aspect of the invention may be configured such that the image display system further includes a storage unit that stores mode data indicating a mode corresponding to the pointer, and the trajectory data processing unit processes the trajectory data in a mode indicated by the mode data stored in the storage unit.

According to the image display system of this configuration, since the mode data indicating the authority given to the pointer is stored in the image display system, the user can change the authority given to the pointer by operating the image display system, for example. In addition, the pointer does not need to manage which authority is given to itself. This is desirable depending on circumstances.

The image display system according to the aspect of the invention may be configured such that the image display system further includes: an image data transmission apparatus including an image data acquisition unit that acquires the image data and a transmission unit that transmits the image data acquired by the image data acquisition unit; and an image display apparatus including a reception unit that receives the image data transmitted from the image data transmission apparatus, the image display unit, the trajectory data generation unit, the storage unit, and a transmission unit that transmits the trajectory data generated by the trajectory data generation unit and mode data corresponding to the pointer, which is stored in the storage unit, to the image data transmission apparatus, and the image data transmission apparatus includes a reception unit that receives the trajectory data and the mode data transmitted from the image display apparatus.

According to the image display system of this configuration, since the image data transmission apparatus used for example, when a user performs an operation of selecting image data used for display and the image display apparatus that displays an image are formed as different apparatuses, a degree of freedom, such as the arrangement of these apparatuses, is increased. In this case, the mode data indicating the authority given to the pointer is stored in the image display apparatus, and the image data transmission apparatus does not need to manage which authority is given to which pointer. This is desirable depending on circumstances.

The image display system according to the aspect of the invention may be configured such that the image display system further includes: an image data transmission apparatus including an image data acquisition unit that acquires the image data, a transmission unit that transmits the image data acquired by the image data acquisition unit, and the storage unit; and an image display apparatus including a reception unit that receives the image data transmitted from the image data transmission apparatus, the image display unit, the trajectory data generation unit, and a transmission unit that transmits the trajectory data generated by the trajectory data generation unit to the image data transmission apparatus, and the image data transmission apparatus includes a reception unit that receives the trajectory data transmitted from the image display apparatus.

Also in the image display system of this configuration, since the image data transmission apparatus used, for example, when a user performs an operation of selecting image data used for display and the image display apparatus that displays an image are formed as different apparatuses, a degree of freedom, such as the arrangement of these apparatuses, is increased. In this case, the mode data indicating the authority given to the pointer is stored in the image data transmission apparatus, and the image display apparatus does not need to manage which authority is given to which pointer. This is desirable depending on circumstances.

The image display system according to the aspect of the invention may be configured such that the image display system further includes a mode data receiving unit that receives mode data, which indicates a mode corresponding to the pointer among a plurality of modes regarding a process of the trajectory data, from the pointer, and the trajectory data processing unit processes the trajectory data in a mode indicated by the mode data received by the mode data receiving unit.

According to the image display system of this configuration, the image display system can determine the mode of the process of the trajectory data, which is generated according to the operation of the user on the pointer, according to the mode data transmitted from the pointer. In addition, the image display apparatus does not need to manage which authority is given to which pointer. This is desirable depending on circumstances.

The image display system according to the aspect of the invention may be configured such that the image display system further includes: an image data transmission apparatus including an image data acquisition unit that acquires the image data and a transmission unit that transmits the image data acquired by the image data acquisition unit; and an image display apparatus including an image data receiving unit that receives the image data transmitted from the image data transmission apparatus, the image display unit, the trajectory data generation unit, the mode data receiving unit, and a transmission unit that transmits to the image data transmission apparatus the trajectory data generated by the trajectory data generation unit and the mode data received by the mode data receiving unit, and the image data transmission apparatus includes a reception unit that receives the trajectory data and the mode data transmitted from the image display apparatus.

According to the image display system of this configuration, since the image data transmission apparatus used, for example, when a user performs an operation of selecting image data used for display and the image display apparatus that displays an image are formed as different apparatuses, a degree of freedom, such as the arrangement of these apparatuses, is increased. In this case, the mode data indicating the authority given to the pointer is received from the pointer by the image display apparatus, and is transmitted to the image data transmission apparatus. For this reason, both the image data transmission apparatus and the image display apparatus do not need to manage which authority is given to which pointer. This is desirable depending on circumstances.

The image display system according to the aspect of the invention may be configured such that the image display system further includes: an imaging unit that generates imaging data by imaging the pointer or light emitted from the pointer; and a mode specification unit that specifies a mode corresponding to the pointer, among a plurality of modes regarding a process of the trajectory data, on the basis of an image shown by the pointer or the light emitted from the pointer, which is indicated by the imaging data generated by the imaging unit, or regularity of a change of an image shown by the light emitted from the pointer and the trajectory data processing unit processes the trajectory data in a mode specified by the mode specification unit.

According to the image display system of this configuration, since the user selects and uses a pointer having desired authority among a plurality of pointers having different colors or shapes, different patterns attached to the surfaces, and different wavelengths or flickering patterns of light emitted therefrom, for example, it is possible to select a mode of the process of trajectory data generated by the writing operation using the pointer.

BRIEF DESCRIPTION OF THE DRAWINGS

The invention will be described with reference to the accompanying drawings, wherein like numbers reference like elements.

FIG. 10 is a diagram showing the configuration of a data group stored in a device according to the second embodiment.

DESCRIPTION OF EXEMPLARY EMBODIMENTS

First Embodiment

Figure 1:
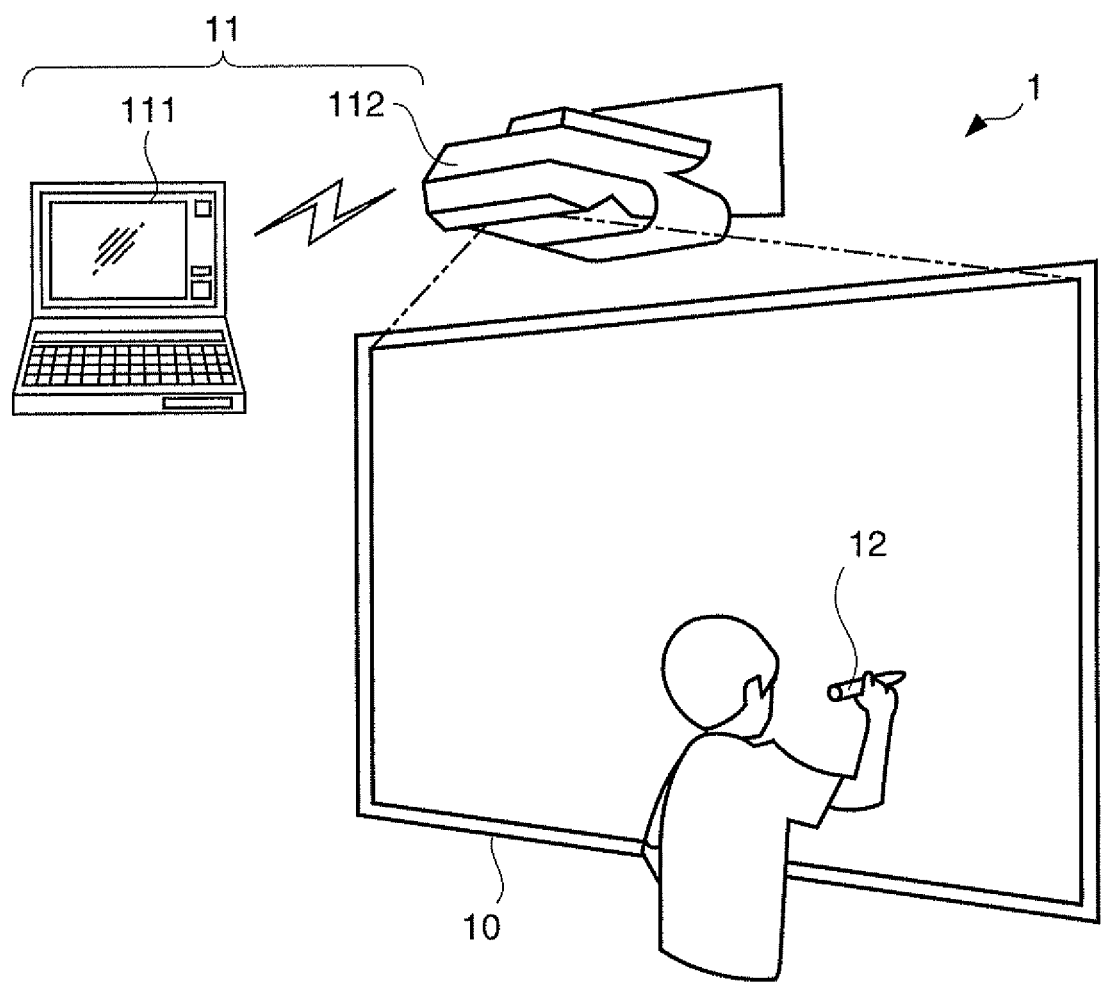
FIG. 1 is a diagram showing the overall configuration of an IWB system according to a first embodiment.

FIG. 1 is a diagram showing the overall configuration of an IWB system (interactive white board system) 1 according to an embodiment of the invention. The IWB system 1 includes a screen 10 that forms a display surface of an image, an image display system 11 that displays an image on the screen 10, and a pen type device (pointer) 12 used as a writing instrument when a user writes handwritten characters or mages electronically on an image displayed on the screen 10.

The image display system 11 includes an image data transmission apparatus 111 that transmits image data, which indicates an image displayed on the screen 10, to an image display apparatus 112 and the image display apparatus 112 that displays the image according to the image data, which has been received from the image data transmission apparatus 111, on the screen 10.

In addition, the image display apparatus 112 has a function of specifying the position of the device 12 on the screen 10 continuously. The image display apparatus 112 transmits trajectory data, which indicates time-series changes (trajectory)

in the position of the device 12 specified as described above, to the image data transmission apparatus 111.

The image data transmission apparatus 111 transmits composite image data indicating a composite image, which is formed by superimposing an image showing the trajectory according to the trajectory data received from the image display apparatus 112 (hereinafter, referred to as a "trajectory image") on a background image acquired separately, to the image display apparatus 112. The image display apparatus 112 displays the composite image data received from the image data transmission apparatus 111 on the screen 10. As a result, the user can perform electronic writing on the image on the screen 10 with a writing operation using the user's device 12.

The image display apparatus 112 is a front projection type short-focus projector. As shown in FIG. 1, for example, the image display apparatus 112 is disposed above the screen 10 so as to be relatively close to the screen 10. Therefore, when a user performs a writing operation, the shadow of the user is hardly reflected on the image projected onto the screen 10.

In addition, in the image display apparatus 112, a method of specifying LED light, which is emitted from the device 12 and is reflected on an image obtained by a camera (imaging unit) that performs imaging in a direction of the screen 10, by image analysis is adopted as a method of specifying the position of the device 12.

For this reason, the device 12 has a mechanism in which LED light is emitted from the pen tip when the pen tip is pressed against the screen 10 by the writing operation of the user. In the IWB system 1, a plurality of devices 12 having different authorities are used. The plurality of devices 12 emit LED light beams having different wavelengths, and the image display apparatus 112 identifies each of the devices 12 used in the writing on the basis of the wavelengths of the LED light beams in image analysis. In addition, the LED light emitted from the device 12 may be visible light, or may be non-visible light (for example, infrared light).

Figure 2:
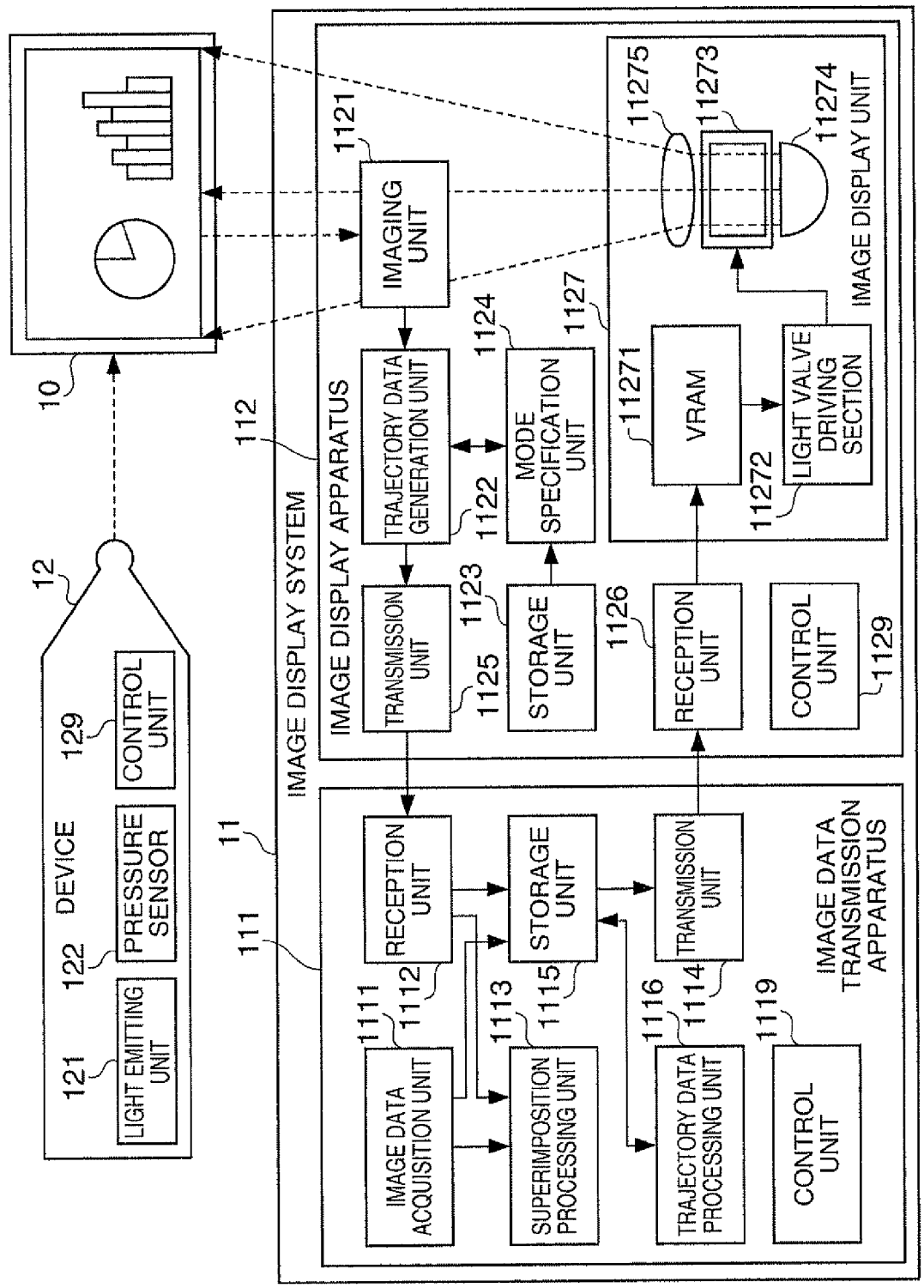
FIG. 2 is a diagram showing the functional configuration of the IWB system according to the first embodiment.

FIG. 2 is a schematic diagram showing the functional configuration of the IWB system 1.

First, the device 12 includes a light emitting unit 121, a pressure sensor 122, and a control unit 129.

The light emitting unit 121 emits LED light, which has a wavelength specific to the device 12, from the pen tip. In addition, the light emitting unit 121 emits LED light, which has a wavelength for deletion (for an eraser function) that is common to all of the devices 12, from the pen head. In addition, the "pen tip" is an end, which is pressed against the screen 10 at the time of writing operation, of both ends of the device 12. In addition, the "pen head" is an end, which is located on the opposite side to the "pen tip", of both the ends of the device 12.

The pressure sensor 122 detects that the pen tip has been pressed against the screen 10 by the writing operation of the user. In addition, the pressure sensor 122 detects that the pen head has been pressed against the screen 10 by the erasing operation of the user using the eraser.

The control unit 129 controls the operation of other units of the device 12.

In addition, each unit of the device 12 operates with electric power supplied from a battery (not shown).

As described above, the image display system 11 includes the image data transmission apparatus 111 that transmits image data to the image display apparatus 112 and the image display apparatus 112 that displays an image according to the image data received from the image data transmission apparatus 111.

In addition, the image data transmission apparatus 111 and the image display apparatus 112 transmit and receive data by wireless communication or cable communication. In this case, a configuration may be adopted in which the image data transmission apparatus 111 and the image display apparatus 112 perform data communication directly, or a configuration may be adopted in which the image data transmission apparatus 111 and the image display apparatus 112 perform data communication through a data relay device, such as a wireless access point or a router.

The image data transmission apparatus 111 is realized as an apparatus including functional units shown in FIG. 2 by causing a general-purpose computer to execute a process according to a program according to an embodiment of the invention. Here, the image data transmission apparatus 111 may also be realized as a so-called dedicated apparatus in which each functional unit shown in FIG. 2 is formed as a hardware unit, for example.

The image data transmission apparatus 111 includes an image data acquisition unit 1111, a reception unit 1112, a superimposition processing unit 1113, a transmission unit 1114, a storage unit 1115, a trajectory data processing unit 1116, and a control unit 1119.

The image data acquisition unit 1111 acquires image data indicating the background image displayed on the screen 10. Various methods, such as a method of acquiring image data by receiving the image data from other data communication devices through a network using a reception unit, a method of acquiring image data by reading the image data from a data recording medium using a data reading unit, and a method of acquiring image data generated by an image data generation unit in the image data transmission apparatus 111 according to the process according to an application program for generating the image data, for example, may be adopted as methods used when the image data acquisition unit 1111 acquires image data.

The reception unit 1112 receives the trajectory data transmitted from the image display apparatus 112 and the mode data, which is data indicating the mode regarding the process of the trajectory data.

The superimposition processing unit 1113 generates composite image data indicating a composite image formed by superimposing the trajectory image, which is indicated by the trajectory data received by the reception unit 1112, on the background image indicated by the image data acquired by the image data acquisition unit 1111.

The transmission unit 1114 transmits the composite image data generated by the superimposition processing unit 1113 to the image display apparatus 112.

The storage unit 1115 stores the image data acquired by the image data acquisition unit 1111 and the trajectory data and the mode data received by the reception unit 1112.

The trajectory data processing unit 1116 processes the trajectory data stored in the storage unit 1115 in the mode indicated by the mode data stored in the storage unit 1115 together with the trajectory data.

Specifically, the processing that the trajectory data processing unit 1116 performs on the trajectory data is saving, printing, deletion, and encryption of the trajectory data. For example, the trajectory data processing unit 1116 stores the trajectory data in the storage unit 1115 only when the mode data indicates a mode called the permission of saving. In addition, the trajectory data processing unit 1116 allows the printing of the trajectory image indicated by the trajectory data to be executed by an external printer only when the mode data indicates a mode called the permission of printing.

In addition, the trajectory data processing unit 1116 allows the trajectory data to be deleted from the storage unit 1115 according to the instruction of the user only when the mode data indicates a mode called the permission of deletion. In addition, when the mode data indicates a mode called encryption, the trajectory data processing unit 1116 encrypts the trajectory data using an encryption key generated according to the password designated by the user and then stores the encrypted data in the storage unit 1115.

The control unit 1119 controls the operation of other units of the image data transmission apparatus 111.

In addition, each unit of the image data transmission apparatus 111 operates with electric power supplied from a power source (not shown).

The image display apparatus 112 includes an imaging unit 1121, a trajectory data generation unit 1122, a storage unit 1123, a mode specification unit 1124, a transmission unit 1125, a reception unit 1126, an image display unit 1127, and a control unit 1129.

The imaging unit 1121 includes an imaging section (for example, an image sensor) disposed toward the screen 10, and generates an image displayed on the screen 10 and imaging data indicating the light emitted from the device 12 by performing imaging at predetermined intervals (for example, every 0.1 seconds) using the imaging section.

The trajectory data generation unit 1122 analyzes an image indicated by the imaging data generated by the imaging unit 1121, detects the light emitted from the device 12, and specifies the position on the screen 10. The trajectory data generation unit 1122 specifies the position of light related to the imaging data, which is sequentially transmitted from the imaging unit 1121, and generates trajectory data indicating time-series changes in the position. In addition, the trajectory data generation unit 1122 transmits data, which indicates the wavelength of the light that specifies the position, to the mode specification unit 1124 and receives mode data from the mode specification unit 1124 as the response.

The storage unit 1123 stores mode data, which indicates the mode of processing regarding the trajectory data generated according to the writing operation of the user using the device 12 identified by the device ID, so as to match the device ID to identify each of the plurality of devices 12.

The mode specification unit 1124 receives the data indicating the wavelength of light from the trajectory data generation unit 1122, specifies the mode data corresponding to the device 12 used in the writing operation by reading the mode data corresponding to the wavelength from the storage unit 1123, and transmits the mode data to the trajectory data generation unit 1122.

The transmission unit 1125 receives the trajectory data and the mode data corresponding to the trajectory data from the trajectory data generation unit 1122 and transmits the trajectory data and the mode data to the image data transmission apparatus 111.

The reception unit 1126 receives the image data (composite image data) transmitted from the image data transmission apparatus 111.

The image display unit 1127 displays an image on the screen 10 according to the image data received by the reception unit 1126.

The control unit 1129 controls the operation of other units of the image display apparatus 112.

In addition, each unit of the image display apparatus 112 operates with electric power supplied from a power source (not shown).

The image display unit 1127 includes a VRAM 11271, a light valve driving section 11272, a liquid crystal light valve 11273, a light source 11274, and a projection lens 11275.

The image data transmitted from the reception unit 1126 is expanded to the VRAM 11271.

The light valve driving section 11272 drives the liquid crystal light valve 11273 according to the image data expanded to the VRAM 11271.

The liquid crystal light valve 11273 is a light modulation device that modulates light incident from the light source 11274 on the basis of image data. The liquid crystal light valve 11273 is driven by the light valve driving section 11272.

The light source 11274 emits light to the liquid crystal light valve 11273.

The light emitted from the light source 11274 and modulated by the liquid crystal light valve 11273 is projected through the projection lens 11275.

The image light transmitted through the projection lens 11275 is projected onto the screen 10 and displayed as an image.

A device database to manage the mode data indicating the mode of processing regarding the trajectory data, which is assigned to each of the plurality of devices 12, is stored in the storage unit 1123 of the image display apparatus 112.

Figures 3, 4:
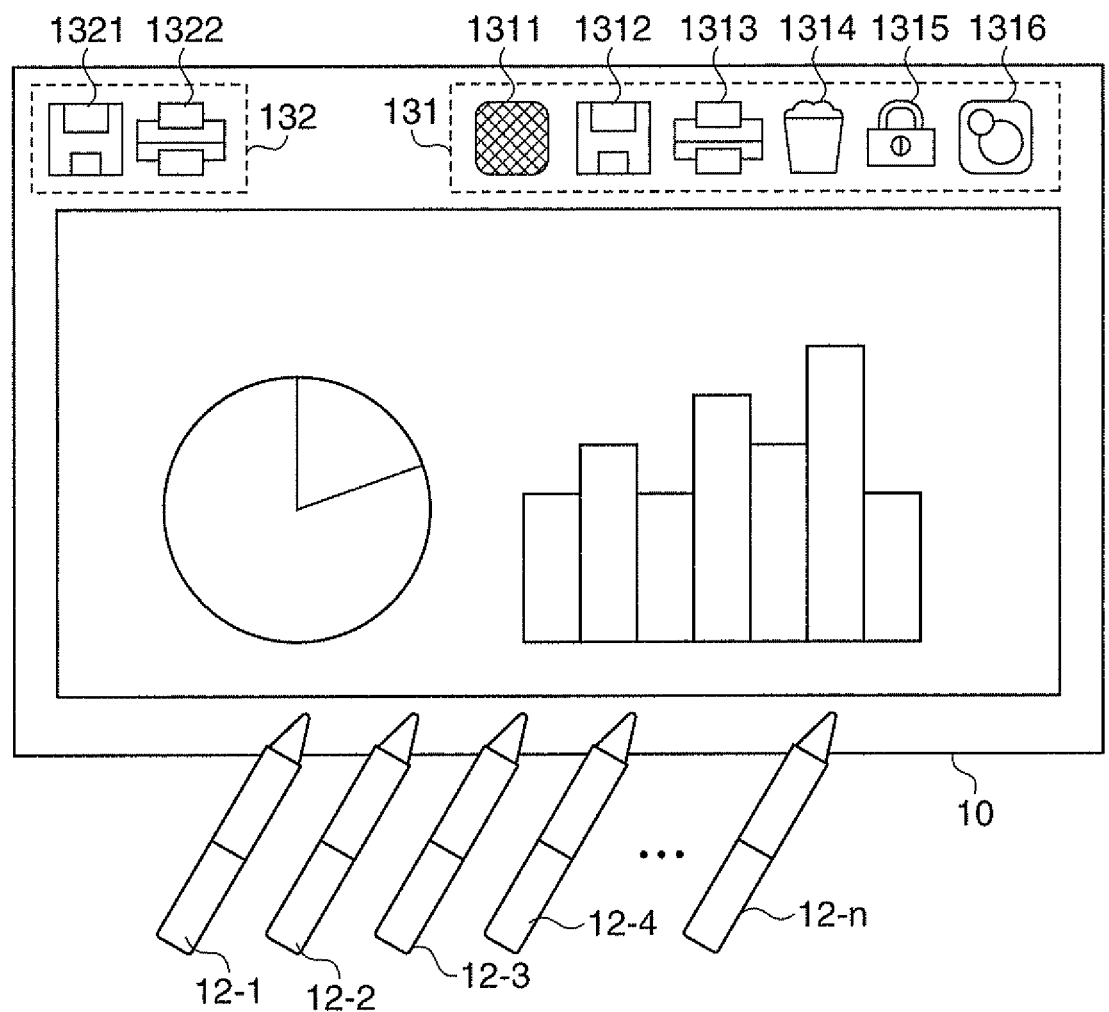
FIG. 3 is a diagram showing the data structure of a device database according to the first embodiment.
FIG. 4 is a diagram showing a state of a screen when waiting for a writing operation in the IWB system according to the first embodiment.

FIG. 3 is a diagram illustrating the data structure of a device database. The device database is a collection of data records regarding each of the plurality of devices 12. Each data record includes the following data fields.

In the data field of a device ID, a device ID to identify the device 12 is stored.

In the data field of a wavelength, data indicating the wavelength of LED light emitted from the pen tip of the device 12 to the screen 10 at the time of writing operation of a user is stored. In addition, if the light emitted from the pen tip of each device 12 is visible light, data indicating the color corresponding to the wavelength may be stored in the data field of the "wavelength" as data indicating the wavelength.

In the data field of save, data indicating whether to permit the saving of trajectory data generated by the trajectory data generation unit 1122 according to the writing operation of the user using the device 12 (data indicating either "savable" or "unsavable") is stored.

In the data field of print, data indicating whether to permit the printing of trajectory data generated by the trajectory data generation unit 1122 according to the writing operation of the user using the device 12 (data indicating either "printable" or "unprintable") is stored.

In the data field of delete, data indicating whether to permit the deletion of trajectory data generated by the trajectory data generation unit 1122 according to the writing operation of the user using the device 12 (data indicating either "deletable" or "undeletable") is stored.

In the data field of encryption, data indicating whether to encrypt trajectory data generated by the trajectory data generation unit 1122 according to the writing operation of the user using the device 12 (data indicating either "encrypted" or "unencrypted") is stored.

In addition, the data fields "save", "print", "delete", and "encryption" of the device database are mode data indicating the mode of processing regarding the trajectory data. Hereinafter, the mode of processing regarding the trajectory data assigned to the device 12 indicated by these mode data items is called "authority" for the sake of convenience.

For example, "device 12 having saving authority" means the device 12 identified by the device ID matched with the mode data "savable".

FIG. 4 is a diagram showing a state of the screen 10 in the IWB system 1 in a state waiting for an operation of a user (not shown) to write characters or figures.

For example, the graph (a bar graph and a pie chart) shown in FIG. 4 is a background image that is generated according to the presentation application in the image data transmission apparatus 111 and is indicated by the image data acquired by the image data acquisition unit 1111.

Figure 5:
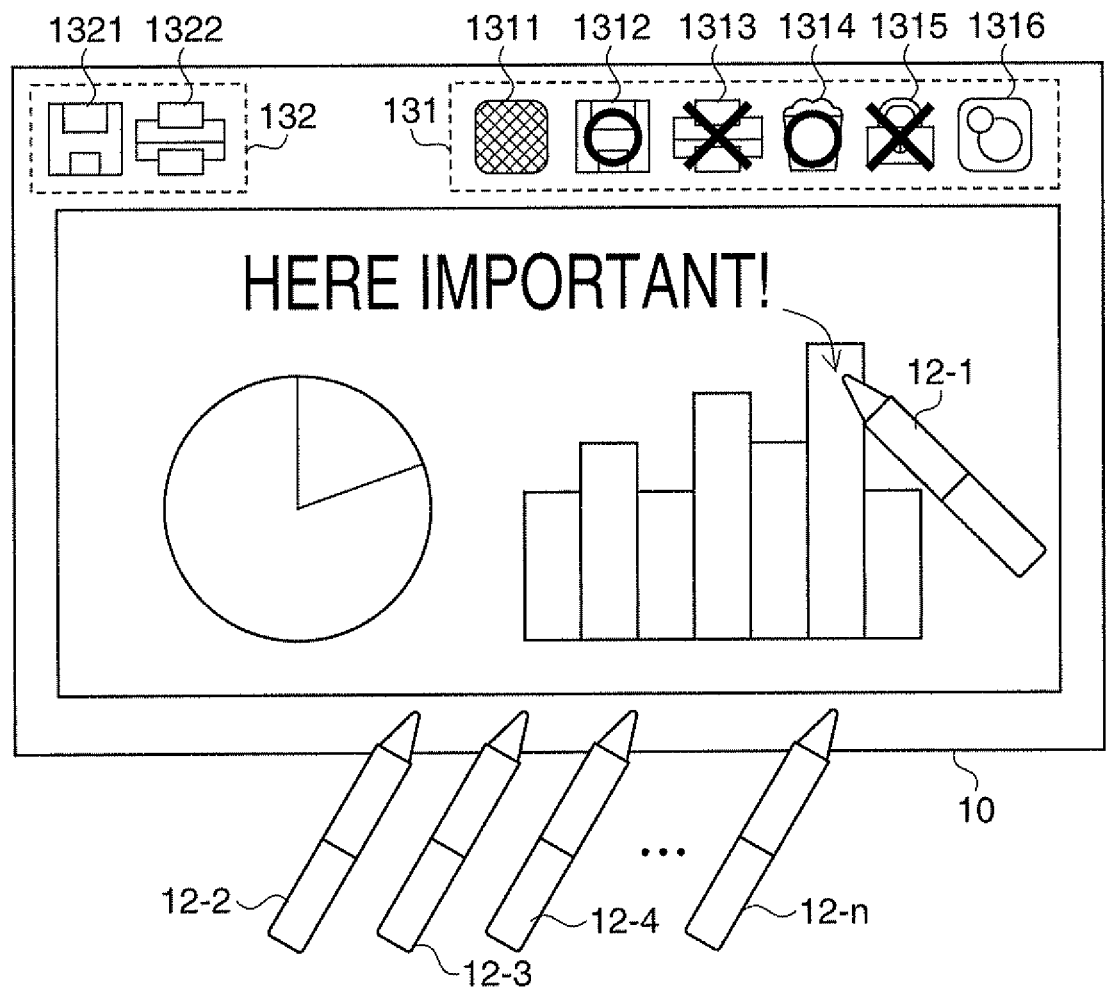
FIG. 5 is a diagram showing a state of a screen when performing a writing operation in the IWB system according to the first embodiment.

FIG. 5 is a diagram showing a state of the screen 10 when a user (not shown) writes characters or figures on an image projected onto the screen 10. In the example shown in FIG. 5, a user selects a device 12-1 as the device 12 having desired authority, writes an arrow indicating a part of the bar graph included in the background image, and then writes the comment "important here".

During the writing operation of the user, LED light is emitted from the device 12-1. The imaging unit 1121 of the image display apparatus 112 generates imaging data, which indicates an image including the LED light emitted light from the device 12-1 and the background image, sequentially by imaging processing. The imaging data generated by the imaging unit 1121 is sequentially transmitted to the trajectory data generation unit 1122.

The trajectory data generation unit 1122 analyzes the image indicated by the imaging data transmitted sequentially from the imaging unit 1121, specifies the position of LED light sequentially, and generates trajectory data. In addition, the data indicating the LED light of the specified position is transmitted to the mode specification unit 1124.

The mode specification unit 1124 searches for the data record corresponding to the device 12-1 from the device database (FIG. 3) using the data indicating the wavelength of the LED light received from the trajectory data generation unit 1122 as a search key, reads data stored in the data fields "wavelength", "save", "print", "delete", and "encryption" of the searched data record, and outputs the data to the trajectory data generation unit 1122 as mode data indicating the authority given to the device 12-1.

The trajectory data generation unit 1122 transmits the mode data, which indicates the authority given to the device 12-1 transmitted from the mode specification unit 1124, to the transmission unit 1125 together with the generated trajectory data. The transmission unit 1125 transmits the trajectory data and the mode data to the image data transmission apparatus 111.

When the trajectory data and the mode data are received from the image display apparatus 112, the reception unit 1112 of the image data transmission apparatus 111 transmits the trajectory data to the superimposition processing unit 1113.

The superimposition processing unit 1113 generates composite image data indicating a composite image formed by superimposing the trajectory image, which is indicated by the trajectory data transmitted from the reception unit 1112, on the background image, which is indicated by the image data transmitted from the image data acquisition unit 1111, and transmits the composite image data to the transmission unit 1114. The transmission unit 1114 transmits the composite image data, which has been transmitted from the superimposition processing unit 1113, to the image display apparatus 112.

The reception unit 1126 of the image display apparatus 112 transmits the composite image data to the image display unit 1127 when the composite image data transmitted from the image data transmission apparatus 111 is received.

In the image display unit 1127, the composite image data is transmitted and expanded to the VRAM 11271.

In addition, when the composite image data that the image display apparatus 112 receives from the image data transmission apparatus 111 is encoded data, the image display unit 1127 decodes the composite image data using a decoding section (not shown in FIG. 2).

In addition, when the composite image data that the image display apparatus 112 receives from the image data transmission apparatus 111 is in a vector format, the image display unit 1127 converts the composite image data received from the image data transmission apparatus 111 (or encoded composite image data obtained by encoding the composite image data received from the image data transmission apparatus 111 when necessary) into composite image data in a raster format using a rasterization processing section (not shown in FIG. 2).

If necessary, the composite image data in a raster format obtained by the encoding and/or rasterization described above is expanded to the VRAM 11271.

The composite image data expanded to the VRAM 11271 is sequentially read into the light valve driving section 11272, and is used for the driving of the liquid crystal light valve 11273.

Light emitted from the light source 11274 is modulated by the liquid crystal light valve 11273 driven by the light valve driving section 11272. The light modulated by the liquid crystal light valve 11273 is projected onto the screen 10 through the projection lens 11275. As a result, an image in which the trajectory image is superimposed on the background image is displayed on the screen 10.

As a result of performing the above-described operation continuously according to the writing operation of the user, characters or figures are written in real time on the background image, which is projected onto the screen 10, according to the writing operation of the user.

Until now, the operation of the IWB system 1 in the case where the trajectory image is displayed so as to be superimposed on the background image when the user performs a writing operation by pressing the pen tip of the device 12 against the screen 10 has been described. However, also when the user performs an erasing operation using an eraser by pressing the pen head of the device 12 against the screen 10, approximately the same processing is performed in the IWB system 1, and a trajectory image displayed at the target position of the operation is erased (not displayed).

That is, "trajectory data generated by the trajectory data generation unit 1122 according to an operation of using the eraser having the pen head is trajectory data of the eraser" is specified by the mode specification unit 1124 on the basis of the wavelength (common to all of the devices 12) of the LED light emitted from the pen head.

The trajectory data generation unit 1122 transmits the trajectory data to the transmission unit 1125 together with the specific mode data indicating erasure. The transmission unit 1125 transmits the trajectory data and the mode data to the image data transmission apparatus 111.

When the mode data indicating erasure and the trajectory data are received, the reception unit 1112 of the image data transmission apparatus 111 transmits them to the trajectory data processing unit 1116. When the transmitted mode data indicates erasure, the trajectory data processing unit 1116 deletes a trajectory image on the trajectory, which is indicated by the trajectory data indicating erasure, of normal trajectory data (trajectory data indicating trajectory image) continuously transmitted to the superimposition processing unit 1113 up to that point of time.

As a result, since the trajectory image displayed at the position where the user has performed an erasing operation with the eraser using the pen head is deleted, it is possible to erase characters or figures with an electronic eraser.

An icon 1311 corresponding to "wavelength", an icon 1312 corresponding to "save", an icon 1313 corresponding to "print", an icon 1314 corresponding to "delete", an icon 1315 corresponding to "encryption", and an icon 1316 corresponding to "setting" are included in an upper right region 131 of the image projected onto the screen 10. The color of the icon 1311 indicates the wavelength of LED light of the device 12 in use. In addition, the color of the icon 1311 is not necessarily matched with the color of the trajectory image displayed according to the writing operation using the device 12.

The icons 1312 to 1315 show the authority given to the device 12 in use. For example, in the example shown in FIG. 5, O mark is given to the icons 1312 and 1314. These icons indicate that the trajectory data generated by the writing operation using the device 12-1 in use can be saved and can be deleted.

In addition, in the example shown in FIG. 5, X mark is given to the icons 1313 and 1315. These icons indicate that the trajectory data generated by the writing operation using the device 12-1 in use cannot be printed and is not encrypted. Thus, the O mark given to these icons indicates that processing corresponding to the icons is permitted or effective, and the X mark given to these icons indicates that processing corresponding to the icons is not permitted or is not effective.

Images of these icons are images that are generated on the basis of mode data by the trajectory data processing unit 1116 of the image data transmission apparatus 111 and are superimposed by the superimposition processing unit 1113.

During the writing operation, the user can see whether or not the characters or figures being currently written can be saved, whether or not the characters or figures being currently written can be printed, whether or not the characters or figures being currently written can be deleted, and whether or not the characters or figures being currently written are encrypted, according to the appearances of the icons 1312 to 1315 shown in the region 131.

When the user wants to change the authority given to the device 12-1, the user can make the setting mode appear by touching the icon 1316 with the pen tip of the device 12-1.

When an icon corresponding to the processing that the user wants to change the authority is touched with the pen tip of the device 12-1 in the setting mode, the authority that is currently given to the processing corresponding to the icon toggles. For example, when the user touches the icon 1312 to which the O mark is given with the pen tip of the device 12, the icon 1312 changes to an icon to which the X mark is given, and the trajectory data generated by the writing operation of the device 12 cannot be saved.

In addition, the above-described touch operation of the device 12 is specified by the change in the position of the pen tip of the device 12 that is indicated by the trajectory data generated by the trajectory data generation unit 1122 on the basis of the imaging data captured by the imaging unit 1121.

When the authority is changed by the touch operation in the setting mode, the device database (FIG. 3) is updated so that the authority after the change is reflected. As a result, the mode of processing regarding the trajectory data generated subsequently by the writing operation using the device 12-1 is changed.

The trajectory data transmitted from the image display apparatus 112 to the image data transmission apparatus 111 is used when displaying the trajectory image on the screen 10 as described above, and is also temporarily stored in the storage unit 1115 of the image data transmission apparatus 111 together with the mode data and the image data indicating the background image.

The image data acquisition unit 1111 transmits the image data, which indicates the same background image as that transmitted to the superimposition processing unit 1113, to the trajectory data processing unit 1116.

In addition, when the trajectory data and the mode data are received from the image display apparatus 112, the reception unit 1112 transmits these data items to the trajectory data processing unit 1116.

The user can save the data indicating the background image and the trajectory image in the storage unit 1115 of the image data transmission apparatus 111 by touching an icon 1321 corresponding to "save" displayed in an upper left region 132 in FIG. 5 with the pen tip of one of the devices 12 at any timing, such as during the presentation or the end of the presentation, for example.

When the icon 1321 is touched, a confirmation screen prompting to confirm the content of the data to be saved is displayed on the screen 10.

Figure 6:
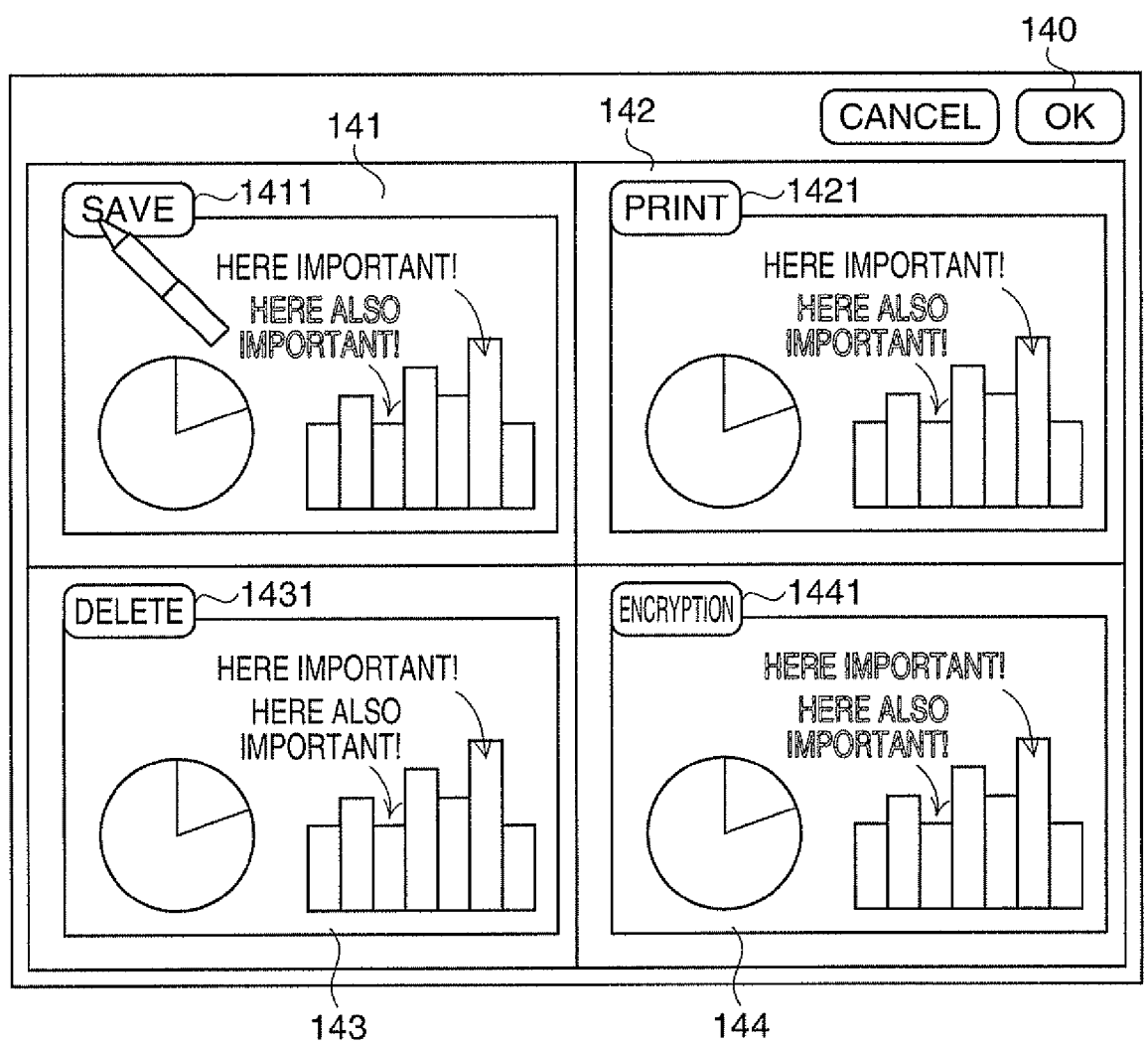
FIG. 6 is a diagram showing a confirmation screen displayed in the IWB system according to the first embodiment.

FIG. 6 is a schematic diagram showing a confirmation screen. The confirmation screen is divided into a region 141 indicating whether or not each trajectory image can be saved, a region 142 indicating whether or not each trajectory image can be printed, a region 143 indicating whether or not each trajectory image can be deleted, and a region 144 indicating whether or not each trajectory image is encrypted. In the region 141, trajectory images are displayed in different display modes. For example, a trajectory image that can be saved is displayed in black (in FIG. 6, displayed in painted characters), and a trajectory image that cannot be saved is displayed in red (in FIG. 6, displayed in slash characters). Similarly, also for the print, delete, and encryption, trajectory images are displayed in different display modes.

The user can check which part of the trajectory image on the confirmation screen is saved, and also check in which attributes (whether or not printable, whether or not deletable, and encrypted or unencrypted) the saved trajectory image is saved.

When the user wants to change the saved trajectory image or the attributes of the saved trajectory image, the user touches a button 1411, 1421, 1431, or 1441 on the confirmation screen with the pen tip of the device 12. The image display apparatus 112 displays an attribute change screen, which is for changing the attribute corresponding to the selected button, on the screen 10 according to the touch operation.

Figures 7, 8:
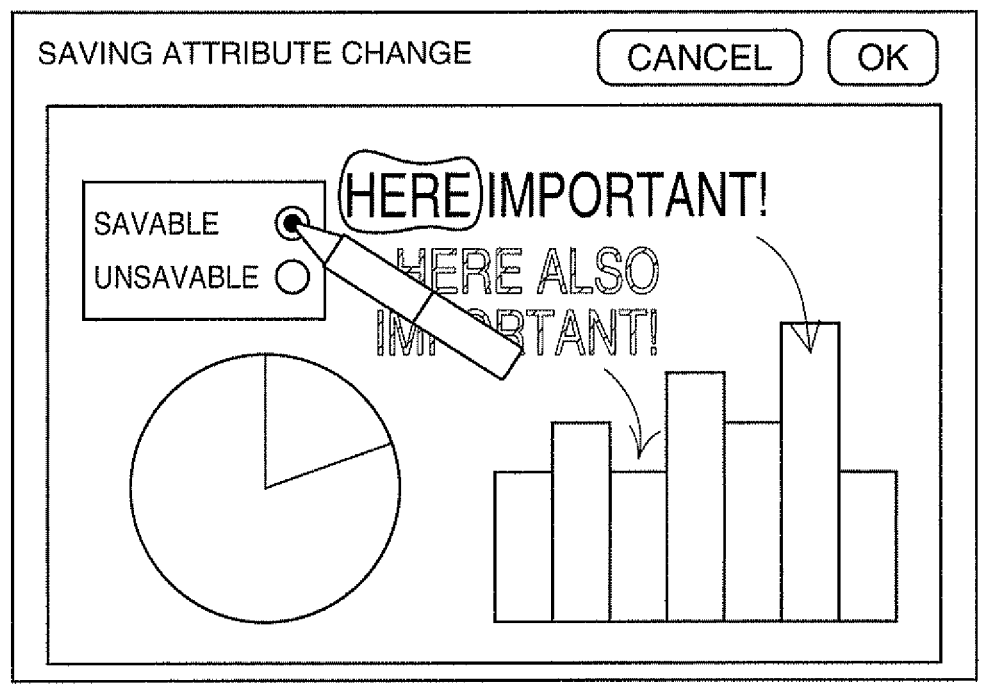
FIG. 7 is a diagram showing an attribute change screen displayed in the IWB system according to the first embodiment.
FIG. 8 is a diagram showing the configuration of a data group stored in an image data transmission apparatus according to the first embodiment.

FIG. 7 is a schematic diagram showing an attribute change screen related to saving that is displayed when the button 1411 is touched as an example. When the user performs a writing operation to write a line, which surrounds a trajectory image that the user wants to change the attribute, on the attribute change screen using the device 12, for example, an option button for changing the attribute of the trajectory image in the surrounded region pops up.

For example, when the user touches one option button of "savable" and "unsavable" with the pen tip of the device 12, the attribute related to the saving of the trajectory image in the designated region is changed. Then, when the user touches an "OK" button displayed on the attribute change screen with the pen tip of the device 12, the confirmation screen is displayed again (FIG. 6).

When the user touches the "OK" button displayed on the confirmation screen, that is, an "OK" button 140 with the pen tip of the device 12 after performing the above-described attribute changing operation when necessary, saving instruction data including the data indicating the above attribute change is transmitted from the image display apparatus 112 to the image data transmission apparatus 111.

When the saving instruction data is received from the image display apparatus 112, the reception unit 1112 of the image data transmission apparatus 111 transmits the saving instruction data to the trajectory data processing unit 1116.

According to the saving instruction data, the trajectory data processing unit 1116 stores the image data indicating the background image, the trajectory data, and the mode data, which are temporarily stored in the storage unit 1115, in the storage unit 1115 in the mode according to the mode data. Specifically, this is as follows.

When the mode data temporarily stored in the storage unit 1115 indicates "unsavable", the trajectory data processing unit 1116 discards the trajectory data corresponding to the mode data.

On the other hand, when the mode data indicates "savable", the trajectory data processing unit 1116 specifies subsequently which of "encrypted" and "unencrypted" the mode data indicates.

When the mode data indicates "encrypted", the trajectory data processing unit 1116 encrypts the trajectory data corresponding to the mode data using an encryption key that is generated according to the password set in advance for the image data transmission apparatus 111 by the user and is stored in the storage unit 1115, for example.

The trajectory data processing unit 1116 stores the image data indicating the background image, which is temporarily stored in the storage unit 1115, in the storage unit 1115 together with the trajectory data and the mode data after performing the process of discard or encryption as described above.

FIG. 8 is a schematic diagram showing the configuration of image data, trajectory data, and mode data stored in the storage unit 1115. The data group shown in FIG. 8 shows a set of data indicating a single composite image. The data group indicating a single composite image includes one item of image data indicating a background image and a plurality of items of trajectory data. The trajectory data and the image data indicating the background image are distinguished by the "type". In addition, image data indicating different trajectories is distinguished by the image ID.

Mode data indicating the attributes ("printable" or "unprintable", "deletable" or "undeletable", and "encrypted" or "unencrypted") of "print", "delete", and "encryption" is stored corresponding to the plurality of items of trajectory data. In addition, mode data related to the saving is not included in the data group shown in FIG. 8 since "savable" of trajectory data already saved is apparent.

In addition, the data structure shown in FIG. 8 indicates a data group showing a single composite image (still image). When the composite image is saved as a moving image, data groups having the configuration shown in FIG. 8 that are arranged in time series are saved, and these show a single moving image as a whole. Alternatively, moving image data indicating a background image and moving image data indicating each trajectory image may be made to configure the data group shown in FIG. 8.

The image data and the trajectory data stored in the storage unit 1115 as described above are used for reproduction display, printing, and the like.

For example, when the user performs an operation to select image data to be reproduced, from the image data indicating a plurality of composite images stored in the storage unit 1115, in the image data transmission apparatus 111, the trajectory data processing unit 1116 reads the image data selected by the user and the trajectory data and the mode data, which are stored corresponding to the image data, from the storage unit 1115.

When the read trajectory data is encrypted, the trajectory data processing unit 1116 displays a screen, which prompts the user to input the password, on a display unit (not shown in FIG. 2). When the correct password is entered on the screen by the user, the trajectory data processing unit 1116 reads the encryption key from the storage unit 1115 to decrypt the trajectory data.

The trajectory data processing unit 1116 transmits the decrypted trajectory data to the superimposition processing unit 1113 together with the image data when necessary. Then, the same processing as described above is performed, so that the image is projected onto the screen 10 by the image display apparatus 112.

In addition, in the reproduction display, an image may be displayed on a display unit (not shown in FIG. 2) in the image data transmission apparatus 111 instead of displaying the image on the screen 10 by the image display apparatus 112. In this case, the superimposition processing unit 1113 transmits the composite image data to the display unit of the image data transmission apparatus 111 instead of transmitting the composite image data to the transmission unit 1114.

For example, when the user performs an operation to instruct the printing of a composite image, which is displayed on the screen 10 or the display unit of the image data transmission apparatus 111, in the image data transmission apparatus 111, the trajectory data processing unit 1116 specifies whether or not the mode data read from the storage unit 1115 is "printable".

The trajectory data processing unit 1116 instructs a printing unit (not shown in FIG. 2) to print an image formed by superimposing the trajectory image indicated by the trajectory data, which is stored corresponding to the mode data indicating "printable", on the background image. As a result, an image not including an unprintable trajectory image is printed out.

In addition, the user can also give the above-described print instruction on the screen 10. That is, when the user touches an icon 1322, which is displayed in the region 132 of the image on the screen 10 shown in FIG. 5, with the pen tip of the device 12, the print instruction data is transmitted from the image display apparatus 112 to the image data transmission apparatus 111 according to the operation. In the image data transmission apparatus 111, an image not including an unprintable trajectory image is printed out according to the print instruction data.

In addition, for example, when the user performs an operation to delete a part of a trajectory image, which is displayed on the screen 10 or the display unit of the image data transmission apparatus 111, in the image on the screen 10 or the image data transmission apparatus 111, the trajectory data processing unit 1116 reads mode data corresponding to the designated trajectory image from the storage unit 1115 and specifies whether or not the mode data indicates "deletable".

When the mode data corresponding to the trajectory image designated to be deleted indicates "deletable", the trajectory data processing unit 1116 instructs the storage unit 1115 to delete the trajectory data. On the other hand, when the mode data corresponding to the trajectory image designated to be deleted indicates "undeletable", the trajectory data processing unit 1116 instructs the superimposition processing unit 1113 to perform superimposed display of a message of "undeletable" without giving an instruction to delete the trajectory data.

As a result, the user's erroneous or intentional deletion of a trajectory image, which should not be deleted, is prevented.

As described above, according to the IWB system 1, when writing characters or figures by hand on the image displayed on the screen 10, the user can intuitively select the mode of processing related to "savable" or "unsavable", "printable" or "unprintable", "deletable" or "undeletable", and "encrypted" or "unencrypted" of the characters or figures by replacing the device 12 used in the writing operation.

Second Embodiment

Hereinafter, an IWB system 2 according to a second embodiment of the invention will be described. The IWB system 2 is the same as the IWB system 1 according to the first embodiment in many respects. Therefore, the following explanation of the IWB system 2 will be focused on the different point from the IWB system 1.

In addition, the same (or corresponding) units of the IWB system 2 as the units of the IWB system 1 are denoted by the same reference numerals used in the IWB system 1.

In the IWB system 2, position specification of the pen type device is performed by a triangulation method using the strength of the radio signal transmitted from the device.

In addition, in the IWB system 2, a device is identified by the frequency of the radio signal transmitted from the device.

In addition, in the IWB system 2, the radio signal transmitted from the device indicates mode data indicating the authority given to the device. Therefore, in the IWB system 2, it is not necessary to manage the authority given to each device in the image display system.

Figure 9:
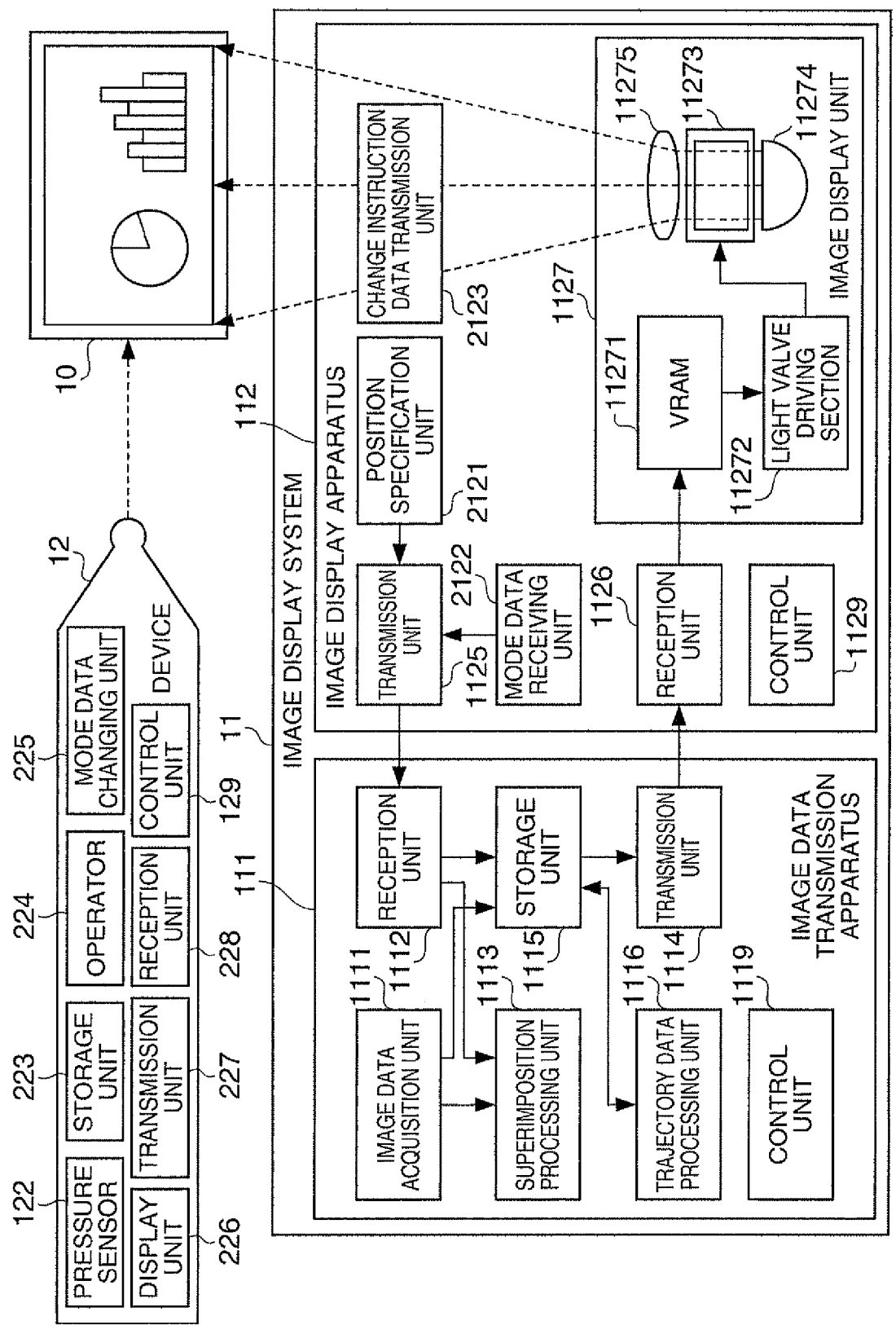
FIG. 9 is a diagram showing the functional configuration of an IWB system according to a second embodiment.

FIG. 9 is a schematic diagram showing the functional configuration of the IWB system 2.

A device 12 used in the IWB system 2 includes a storage unit 223, an operator 224, a mode data changing unit 225, a display unit 226, a transmission unit 227, and a reception unit 228 in addition to the pressure sensor 122 and the control unit 129 provided in the device 12 used in the IWB system 1.

The storage unit 223 stores a device ID to identify the device 12 and mode data indicating the authority given to the device 12.

The operator 224 receives an operation of the user, generates a signal according to the operation, and transmits the signal to the mode data changing unit 225.

The mode data changing unit 225 changes the mode data stored in the storage unit 223 according to the signal transmitted from the operator 224.

The display unit 226 displays the authority given to the device 12.

The transmission unit 227 transmits the mode data as a radio signal.

The reception unit 228 receives change instruction data, which is transmitted from an image display apparatus 112 and indicates a change of the authority of the device 12.

An image data transmission apparatus 111 of an image display system 11 provided in the IWB system 2 is the same as the image data transmission apparatus 111 of the image display system 11 provided in the IWB system 1.

The image display apparatus 112 of the image display system 11 provided in the IWB system 2 does not include the imaging unit 1121, the mode specification unit 1124, and the storage unit 1123 that are provided in the image display apparatus 112 of the image display system 11 in the IWB system 1. Instead of these, the image display apparatus 112 of the IWB system 2 includes a position specification unit 2121, a mode data receiving unit 2122, and a change instruction data transmission unit 2123.

The position specification unit 2121 includes two or more antennas for receiving radio waves that are disposed at different positions. For each device ID corresponding to the frequency of the radio signal transmitted from the device 12 that has been received by each of the antennas, the position specification unit 2121 specifies a distance between the current device 12 and the antenna on the basis of the strength of the radio wave and specifies the current position of the device 12 from these distances according to the triangulation method. The position specification unit 2121 transmits position data indicating the specified position to the trajectory data generation unit 1122.

For each device ID corresponding to the frequency of the radio signal transmitted from the device 12 through the antenna of the position specification unit 2121, the mode data receiving unit 2122 receives mode data indicated by the radio signal.

The change instruction data transmission unit 2123 generates change instruction data, which indicates an instruction to change the authority that is currently given to the device 12, to the device 12 in response to the touch operation that the user performs on the image of the screen 10 using the device 12.

FIG. 10 is a schematic diagram showing a device ID and mode data stored in the storage unit 223 of the device 12. As shown in FIG. 10, a device ID to identify the device 12 and mode data indicating the authority, which is currently given to the device 12, are stored in the device 12.

In the IWB system 2, when the user selects the device 12 having desired authority among the devices 12 having different authorities and performs a writing operation on the image displayed on the screen 10 using the device 12, mode data is transmitted from the transmission unit 227 of the device 12 by the radio signal with a frequency specific to the device 12.

The position specification unit 2121 of the image display apparatus 112 receives the radio signal transmitted from the device 12 using a plurality of antennas, and first specifies the device ID of the device 12, which is a transmission source of the radio signal, on the basis of the frequency of the radio signal. Then, the position specification unit 2121 specifies the position of the device 12 on the basis of the strength of the received radio signal, and generates position data indicating the position. The position specification unit 2121 transmits the position data generated as described above to the trajectory data generation unit 1122 together with the device ID.

When the position data is received from the position specification unit 2121, the trajectory data generation unit 1122 generates trajectory data, which indicates a time-series change in the position indicated by the position data, for each device ID according to the position data.

In addition, the mode data receiving unit 2122 receives the mode data transmitted as a radio signal from the device 12, and transmits the mode data to the trajectory data generation unit 1122 together with the device ID specified by the frequency of the radio signal.

The trajectory data generation unit 1122 matches the trajectory data generated as described above and the mode data, which has been transmitted from the mode data receiving unit 2122, to the device ID corresponding thereto and transmits them to the transmission unit 1125.

The transmission unit 1125 transmits the trajectory data and the mode data, which have been transmitted from the trajectory data generation unit 1122, to the image data transmission apparatus 111 together with the device ID corresponding thereto. Then, the same processing as in the IWB system 1 is performed.

In addition, in the IWB system 1, the "wavelength" included in the mode data serves as a device ID to identify a device. In the IWB system 2, however, a device ID identified by the frequency of the radio signal transmitted from the device 12 is used as data to identify a device as it is, instead of the wavelength.

When the user wants to change the authority given to the device 12, the user can instruct the IWB system 2 to change the authority by touching the icon displayed in the region 131 on the screen 10 with the pen tip of the device 12 in the same manner as in the IWB system 1.

In this case, the change instruction data transmission unit 2123 of the image display apparatus 112 generates change instruction data, which indicates the authority after the change, in response to the touch operation of the user, and transmits the change instruction data that is generated as a radio signal with a frequency specific to the device 12 used for the change instruction from the user.

When the change instruction data transmitted from the image display apparatus 112 is received, the reception unit 228 of the device 12 transmits the change instruction data to the mode data changing unit 225. The mode data changing unit 225 changes the mode data (FIG. 10) stored in the storage unit 223 according to the change instruction data.

The user may also change the authority currently given to the device 12 by operating the device 12 directly. In this case, the user displays the authority, which is currently given, on the display unit 226 by operating the operator 224 of the device 12, and then gives an instruction to change the authority by operating the operator 224.

The device 12 changes the mode data (FIG. 10) stored in the storage unit 223 according to the instruction from the user.

When the authority is changed as described above, the device 12 transmits a radio signal, which indicates mode data after the change, in subsequent transmission of radio signals according to the writing operation of the user. As a result, switching of the authority given to the device 12 is realized.

Also in the IWB system 2, in the same manner as in the IWB system 1, when writing characters or figures by hand on the image displayed on the screen 10, the user can intuitively select the mode of processing related to "savable" or "unsavable", "printable" or "unprintable", "deletable" or "undeletable", and "encrypted" or "unencrypted" of the characters or figures by replacing the device 12 used in the writing operation.

In addition, according to the IWB system 2, the authority given to the device 12 is managed by the device 12. Therefore, since the authority given to the same device 12 is not changed when the same device 12 is used together with the different image display system 11, for example, this is convenient depending on circumstances.

Modification Examples

The embodiments described above are specific examples of the invention, and various modifications may be made within the range of the technical scope of the invention. Hereinafter, these modification examples will be described.

In the embodiments described above, the front projection type projector is adopted as an image display apparatus. The invention is not limited in this regard. For example, a rear projection type projector, a liquid crystal display, and the like may also be used as image display apparatuses.

In addition, a method of specifying the position of a device by analyzing an image formed by imaging the light emitted from the device is adopted as a device position specifying method in the first embodiment described above, and a method of specifying the position of a device from the radio wave strength when the radio wave emitted from the device is received at different positions is adopted as a device position specifying method in the second embodiment described above.

The invention is not limited in this regard. For example, it is also possible to adopt any of a pressure-sensitive method of specifying the position of a device using pressure-sensitive sensors disposed in a matrix on the image display surface, a laser beam method of specifying the position of a device by detecting that laser beams, which are emitted in a plurality of directions so as to be approximately parallel to the image display surface, have been blocked using a light receiving sensor, a method using an ultrasonic wave instead of a radio wave, a method using infrared light instead of a laser beam, and the like.

In addition, in the first embodiment, a configuration is adopted in which LED light having a specific wavelength is emitted from the device and the position of the device is specified by specifying the emission portion of the light by image analysis. Instead of this, for example, a configuration may also be adopted in which the color of the device itself or the color of attachments, such as a cap attached to the device, is changed for each device and the device is identified on the basis of the wavelength of the color. Similarly, a configuration may also be adopted in which a different mark or a different pattern is placed on the surface of each device instead of the color and the device is identified on the basis of the mark or the pattern.

For example, in the case of the configuration in which the device is identified by the color of the device, the IWB system according to each embodiment of the invention is also realized by wearing a ring type device or a fingerstall type device with a different color on the finger and performing a writing operation on the display surface with a finger.

In addition, a configuration may also be adopted in which, for example, the emission pattern (for example, light emission flickering at predetermined intervals) of LED light is changed for each device and the device is identified on the basis of the emission pattern. In addition, it is needless to say that light other than the LED light may also be used as light emitted from the device.

In addition, in each of the embodiments described above, a configuration is adopted in which the authority given to the device is changed by the operation using the device on the display surface (screen) (first or second embodiment) or by the operation on the device (second embodiment). The invention is not limited in this regard. For example, a configuration may be adopted in which the authority given to the device is changed by other methods involving an operation on the operator, such as a button provided in the image display apparatus, and an operation on the image data transmission apparatus.

In addition, it is also possible to adopt a configuration in which the authority given to the device is not changed. In this case, for example, by displaying the fixed authority, such as "unsavable" or "printable", on the surface of the device, the user can more intuitively perform the selection of authority according to the selection of a device. This is desirable depending on circumstances.

In addition, in the embodiments described above, a configuration is adopted in which the image display system includes the image data transmission apparatus and the image display apparatus. The invention is not limited in this regard. For example, it is also possible to configure an integrated image display system in which these apparatuses are disposed in a single housing. In this case, data transmission and reception between the image data transmission apparatus and the image display apparatus are performed in the same housing.

In addition, in the first embodiment described above, a configuration is adopted in which the mode data indicating the authority given to the device is managed by the image display apparatus. The invention is not limited in this regard. For example, it is also possible to adopt a configuration in which the above management is performed by the image data transmission apparatus.

In this case, the image data transmission apparatus stores, for example, a device database (FIG. 3), and the image display apparatus transmits a device ID and trajectory data to the image data transmission apparatus. In addition, the image data transmission apparatus may specify the mode data corresponding to the trajectory data received from the image display apparatus by searching for the mode data of the device from the device database using the device ID transmitted from the image display apparatus as a search key.

In addition, in the embodiments described above, a configuration is adopted in which the saving of image data, trajectory data, and mode data is performed by the image data transmission apparatus. The invention is not limited in this regard. For example, the saving of these data items may also be performed by the image display apparatus. In addition, a configuration may also be adopted in which one of the apparatuses records these data items on an external data recording medium.

When the saving of trajectory data and the like is performed by the image display apparatus, the image display apparatus receives these data items from the image data transmission unit and performs the saving of these data items. In this case, the image display apparatus may include a trajectory data processing unit that determines whether or not it is necessary to save and encrypt the data according to the mode data (regarding saving and encryption) and discards trajectory data, which cannot be saved, or encrypts trajectory data, which needs to be encrypted.

The trajectory data and the like saved in the image display apparatus as described above are transmitted to the image data transmission apparatus at the time of reproduction display and are subjected to superimposition processing in the image data transmission apparatus. Then, the trajectory data and the like are returned to the image display apparatus and are used for image display. Alternatively, a configuration may also be adopted in which the image display apparatus includes a superimposition processing unit and the trajectory data and the like are used for image display after superimposition processing in the image display apparatus. In the latter case, an image data transmission apparatus is not necessary at the time of reproduction display. This is convenient depending on circumstances.

In addition, in the embodiments described above, saving, printing, deletion, and encryption are adopted as modes of processing regarding the trajectory data. The invention is not limited in this regard, and it is also possible to adopt a configuration in which other kinds of modes, such as a mode regarding display and a mode regarding the change of the color or the size, can be selected by device selection, for example.

In addition, in the embodiments described above, as shown in FIG. 8, a configuration is adopted in which "encrypted" or "unencrypted" is designated in units of trajectory data. However, the units of encryption and decryption for the data group shown in FIG. 8 may not necessarily be individual units of data included in the data group shown in FIG. 8.

For example, when a configuration is adopted in which encryption and decryption are performed for each item of trajectory data, an image on which only a trajectory image indicated by the trajectory data that is not encrypted is superimposed can be displayed if a correct password is not entered at the time of decryption.

On the other hand, when a configuration is adopted in which the entire data group is encrypted for a data group including at least one encrypted item of trajectory data, for example, a trajectory image indicated by unencrypted trajectory data is not displayed either if a correct password is not entered at the time of decryption.

In both the cases, a highly confidential trajectory image is not displayed easily unless a right password or the like is entered.

In addition, in the embodiments described above, each device is identified. Accordingly, a plurality of users can simultaneously perform writing operations on the display surface using different devices. The invention is not limited in this regard, and a configuration may also be adopted in which only one user can perform a writing operation at the same time. In this case, a mechanism that uniquely identifies the positions of a plurality of devices used simultaneously is not necessary. This is desirable depending on circumstances since a system can be realized simply.

What is claimed is:

1. An image display system comprising:
    an image display unit that displays an image indicated by image data on a display surface;
    a trajectory data generation unit that specifies a position on the display surface indicated by a pointer and generates trajectory data indicating a trajectory of the pointer on the display surface, and transmits (i) data indicating a wavelength of light emitted from the pointer, which corresponds to a specific identity of the pointer, (ii) data indicating an emission pattern of light emitted from the pointer, which corresponds to the specific identity of the pointer, or (iii) data of an image of a physical feature of the pointer, which corresponds to the specific identity of the pointer;
    the image display unit displaying an image of the trajectory, which is indicated by the trajectory data generated by the trajectory data generation unit, on the display surface;
    a trajectory data processing unit that processes the trajectory data generated by the trajectory data generation unit in association with the image data according to an authorized processing mode of the pointer, the authorized processing mode corresponding to the specific identity of the pointer and being a processing that the pointer is authorized to execute among a plurality of processing modes; and
    a first storage unit, operating under control of a control unit, that stores a database that manages a mode data indicating a mode of processing regarding the trajectory data, which is assigned to the pointer.

2. The image display system according to claim 1, wherein the trajectory data processing unit performs at least one of display of an image indicated by the trajectory data, saving of the trajectory data, printing of an image indicated by the trajectory data, deletion of the trajectory data, encryption of the trajectory data, and changes of attributes of the trajectory data.

3. The image display system according to claim 1, further comprising:
    a second storage unit that stores mode data indicating a mode corresponding to the pointer,
    wherein the trajectory data processing unit processes the trajectory data in a mode indicated by the mode data stored in the second storage unit.

4. The image display system according to claim 3, further comprising:
an image data transmission apparatus including an image data acquisition unit that acquires the image data and a transmission unit that transmits the image data acquired by the image data acquisition unit; and
an image display apparatus including a reception unit that receives the image data transmitted from the image data transmission apparatus, the image display unit, the trajectory data generation unit, the first storage unit, and a transmission unit that transmits the trajectory data generated by the trajectory data generation unit and mode data corresponding to the pointer, which is stored in the first storage unit, to the image data transmission apparatus,
wherein the image data transmission apparatus includes a reception unit that receives the trajectory data and the mode data transmitted from the image display apparatus.

5. The image display system according to claim 3, further comprising:
an image data transmission apparatus including an image data acquisition unit that acquires the image data, a transmission unit that transmits the image data acquired by the image data acquisition unit, and the second storage unit; and
an image display apparatus including a reception unit that receives the image data transmitted from the image data transmission apparatus, the image display unit, the trajectory data generation unit, and a transmission unit that transmits the trajectory data generated by the trajectory data generation unit to the image data transmission apparatus,
wherein the image data transmission apparatus includes a reception unit that receives the trajectory data transmitted from the image display apparatus.

6. The image display system according to claim 1, further comprising:
a mode data receiving unit that, operating under control of the control unit, receives mode data, which indicates a mode corresponding to the pointer among a plurality of modes regarding a process of the trajectory data stored in the first storage unit, from the pointer,
wherein the trajectory data processing unit processes the trajectory data in a mode indicated by the mode data received by the mode data receiving unit.

7. The image display system according to claim 6, further comprising:
an image data transmission apparatus including an image data acquisition unit that acquires the image data and a transmission unit that transmits the image data acquired by the image data acquisition unit; and
an image display apparatus including an image data receiving unit that receives the image data transmitted from the image data transmission apparatus, the image display unit, the trajectory data generation unit, the mode data receiving unit, and a transmission unit that transmits to the image data transmission apparatus the trajectory data generated by the trajectory data generation unit and the mode data received by the mode data receiving unit,
wherein the image data transmission apparatus includes a reception unit that receives the trajectory data and the mode data transmitted from the image display apparatus.

8. The image display system according to claim 1, further comprising:
an imaging unit that generates imaging data by imaging the pointer or light emitted from the pointer; and
a mode specification unit that specifies a mode corresponding to the pointer, among a plurality of modes regarding a process of the trajectory data, on the basis of an image shown by the pointer or the light emitted from the pointer, which is indicated by the imaging data generated by the imaging unit, or regularity of a change of an image shown by the light emitted from the pointer,
wherein the trajectory data processing unit processes the trajectory data in a mode specified by the mode specification unit.

9. The image display system according to claim 1, wherein the trajectory data processing unit processes the trajectory data of the pointer in association with the image data according to the authorized processing mode, the authorized processing mode being at least one of saving of the trajectory data in association with the image data, printing of an image indicated by the trajectory data in association with the image data, deletion of the trajectory data, encryption of the trajectory data in association with the image data, and changes of attributes of the trajectory data in association with the image data.

10. The image display system according to claim 1, wherein the trajectory data generation unit transmits the data indicating a wavelength of light emitted from the pointer, which corresponds to a specific identity of the pointer.

11. The image display system according to claim 10, wherein the wavelength of light is a wavelength of LED light.

12. The image display system according to claim 1, wherein the trajectory data generation unit transmits the data indicating an emission pattern of light emitted from the pointer, which corresponds to the specific identity of the pointer.

13. The image display system according to claim 1, wherein the trajectory data generation unit transmits the data of an image of a physical feature of the pointer, which corresponds to the specific identity of the pointer.

14. The image display system according to claim 1, wherein the physical feature of the pointer comprises a color, a mark placed on a surface of the pointer, or a pattern placed on the surface of the pointer.

15. An image display system comprising:
an image display unit that displays an image indicated by image data on a display surface;
a pointer that comprises a light emitting unit configured to transmit light having a wavelength;
a trajectory data generation unit that specifies a position on the display surface indicated by the pointer and generates trajectory data indicating a trajectory of the pointer on the display surface,
the image display unit displaying an image of the trajectory, which is indicated by the trajectory data generated by the trajectory data generation unit, on the display surface;
a storage unit, operating under control of a control unit, that stores a database that manages a mode data indicating a mode of processing regarding the trajectory data, which is assigned to the pointer;
a mode specification unit that is configured to search the storage unit for the mode data corresponding the pointer, using data indicating the wavelength as a search key, and output the mode data; and
a trajectory data processing unit that processes the trajectory data generated by the trajectory data generation unit in association with the image data according to an authorized processing mode of the pointer, the authorized processing mode being indicated by the mode data and being a processing that the pointer is authorized to execute among a plurality of processing modes.

16. The image display system according to claim 15, wherein the authorized processing mode comprises saving of the trajectory data, printing of the trajectory data, or deletion of the trajectory data.

17. An image display system comprising:

an image display unit that displays an image indicated by image data on a display surface;

a plurality of pointers, each having a different specific identity, and each comprising (i) a light emitting unit configured to transmit light having a wavelength which corresponds to the specific identity of the respective pointer; (ii) a light emitting unit configured to transmit light with an emission pattern which corresponds to the specific identity of the respective pointer, or (iii) a physical feature which corresponds to the specific identity of the pointer;

a trajectory data generation unit that specifies a position on the display surface indicated by one or more of the pointers and generates trajectory data indicating a trajectory of the one or more pointers on the display surface, the image display unit displaying an image of the trajectory, which is indicated by the trajectory data generated by the trajectory data generation unit, on the display surface;

a storage unit, operating under control of a control unit, that stores a database that manages mode data indicating modes of processing regarding the trajectory data, which are assigned respectively to the pointers; and a trajectory data processing unit that processes the trajectory data generated by the trajectory data generation unit in association with the image data according to respective authorized processing modes of the pointers, the authorized processing modes corresponding to the specific identities of the respective pointers, and being indicated by the mode data and being processing that the pointers are authorized to execute among a plurality of processing modes.

18. The image display system according to claim 17, wherein the authorized processing modes comprise saving of the trajectory data, printing of the trajectory data, and deletion of the trajectory data.

* * * * *